March 5, 1940.  P. MESHBERG  2,192,602
BRAKE TESTER DEVICE FOR AUTOMOBILES OR THE LIKE
Filed May 18, 1936  2 Sheets-Sheet 1
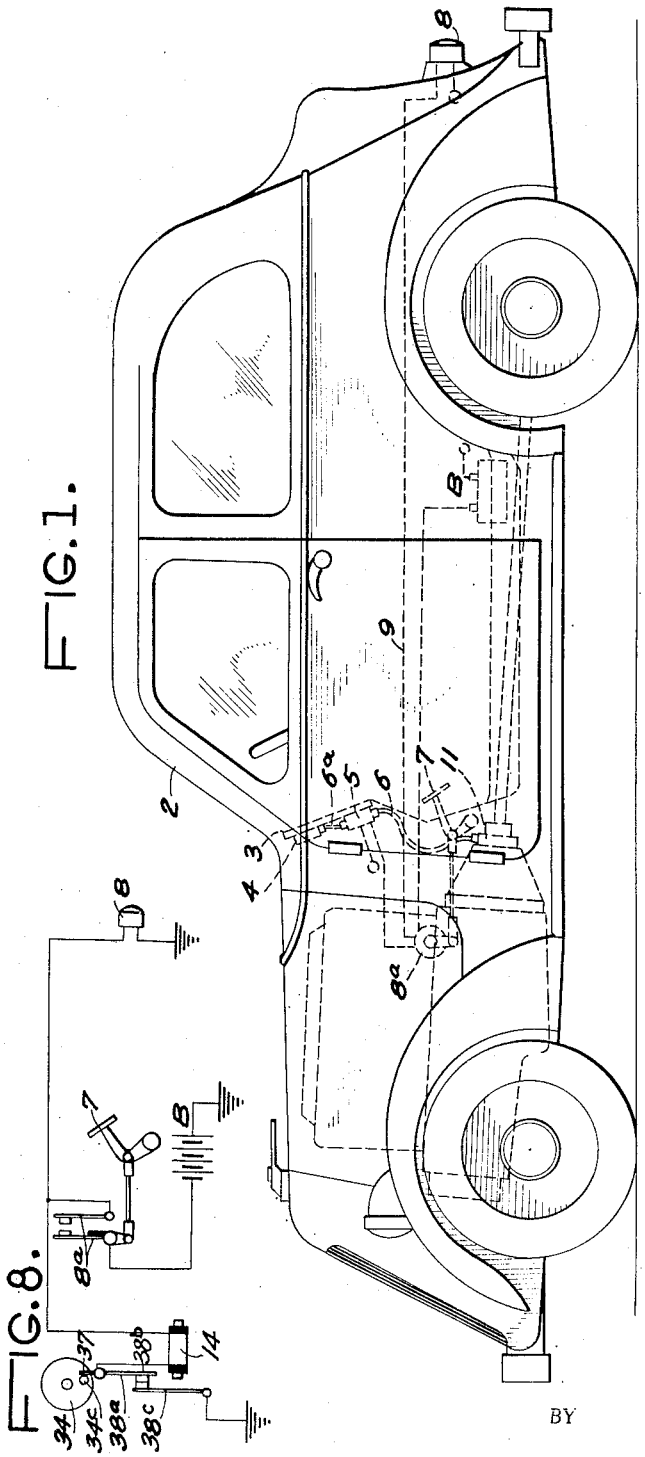
INVENTOR.
PHILIP MESHBERG.
Louis Casper
ATTORNEY.

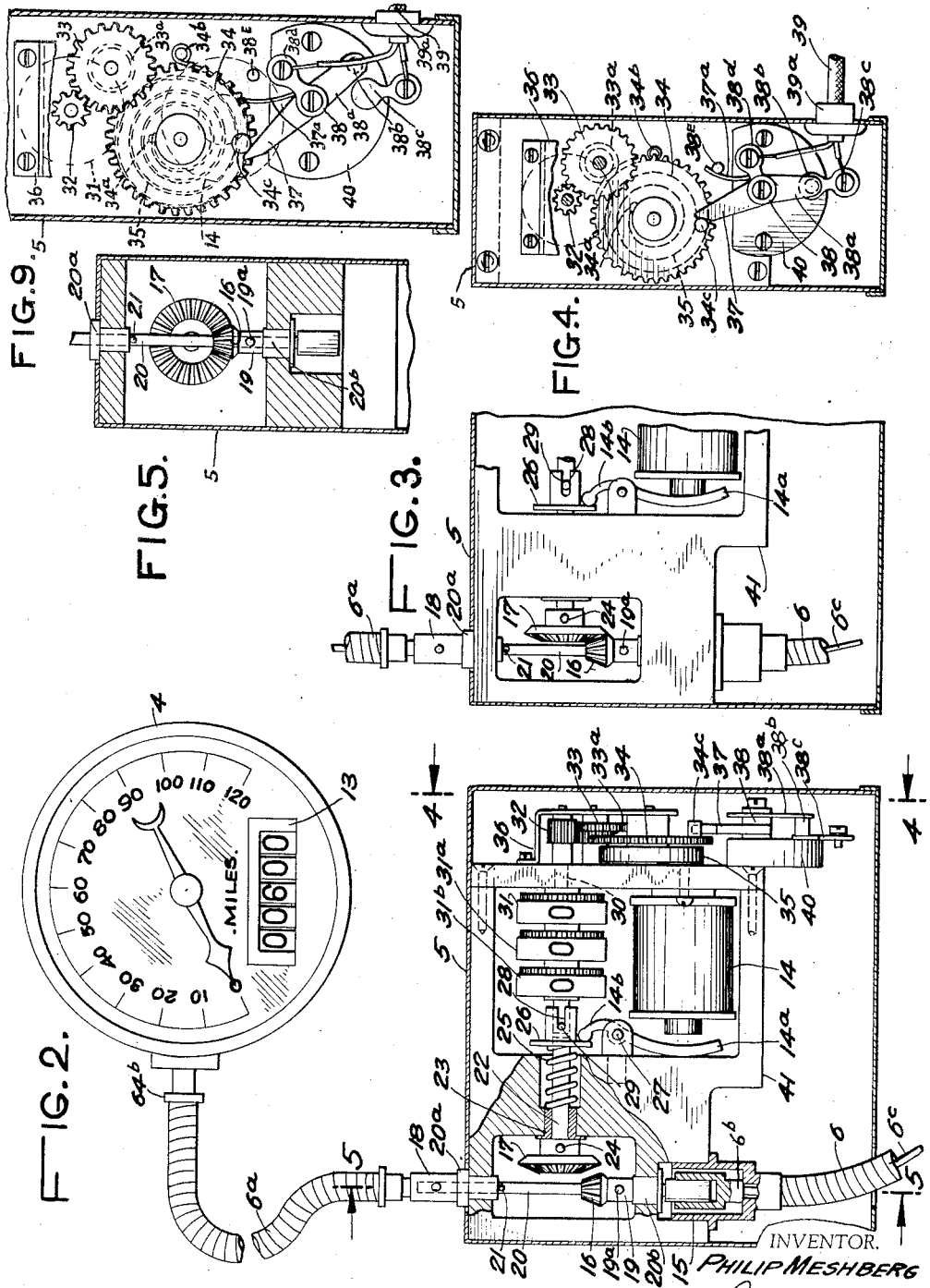

Patented Mar. 5, 1940

2,192,602

UNITED STATES PATENT OFFICE 2,192,602

BRAKE TESTER DEVICE FOR AUTOMOBILES OR THE LIKE

Philip Meshberg, Bridgeport, Conn.

Application May 18, 1936, Serial No. 80,319

9 Claims. (Cl. 73—51)

My invention relates to that class of brake testers for automobiles or similar vehicles whereby the travel distance of said automobiles may be accurately measured after the brake in said vehicles had been applied. Such a device is also very desirable in the fact that the exact number of feet that a vehicle has travelled can be registered upon a series of registering wheels regardless of the condition of the road traversed, the testing unit not being affected by the latter. The brake testing unit is preferably mounted on the dashboard and clearly visible to the driver of the vehicle.

The invention further provides means for drivers operating cars to enable them to judge accurately the stopping distances of said cars travelling at different speeds after the brakes had been applied. This desirable feature makes it possible for the driver to accurately know when to apply the brake in order to bring the car to a stop within a required and safe distance.

Further objects of this invention will appear as the description of the same proceeds.

Referring to the drawings—

Fig. 1 is a view of a car proper showing in broken lines the location of the brake tester unit or device and associated flexible shaft. There is also shown the location of the speedometer combination stop light and brake tester switch and the brake pedal.

Fig. 2 is a sectional front view of the brake tester unit in released position and showing the flexible shaft connection with the speedometer.

Fig. 3 is a partial front view of the brake tester showing in detail the actual operating position of the bevel gears when the latter are thrown into engagement by means of the electro-magnet 14.

Fig. 4 is a side view of the brake tester unit showing the reset mechanism thereof and contact switch for breaking the brake tester operating circuit. The switch is shown in a closed position.

Fig. 5 is a side sectional view of the brake tester device as shown in Fig. 2.

Fig. 6 is a detail of the switch control of the brake tester unit. Said figure illustrates the position of the switch when the car operator operates the brake lever at the time the car is travelling in reverse direction.

Fig. 7 is a modification of the brake tester unit incorporated in and made a part of a speedometer unit.

Fig. 8 is a diagram of the combination brake tester unit and tail light circuit.

Fig. 9 is a further detail of the switch control of the brake tester unit. The figure further shows the position of the switch after the mechanism within the unit has exceeded its registering limit.

Referring to the drawings—

The numeral 2 designates the car proper. Inside said car mounted in the usual manner is the dashboard 3.

Mounted upon the dashboard 3 is the speedometer 4 and also the brake tester unit 5. A flexible shaft 6 is connected between said brake tester and the transmission 11 of said car. A flexible shaft 6ª also operably connects said brake tester device with the speedometer 4.

A circuit 9 (Fig. 1) includes the stop light 8 of the car, the brake tester control switch 8ª, and the storage battery B.

The connecting circuit including the magnet 14 in the brake tester unit and the combination control switch is shown in Fig. 8. This circuit is energized and operated simultaneously with the operation of the stop light circuit.

The depression of the brake pedal 7 by the operator of the car 2 closes the stop light circuit and also closes the brake tester circuit as shown in Fig. 8 thereby energizing the magnet 14.

Referring to Fig. 2 the terminal coupling 15 of the flexible shaft 6 is interchangeable with the coupling connection of the speedometer 4. In the event of the installation of the brake tester device upon a car, the flexible shaft terminal coupling 6ᵇ that is normally connected to the speedometer 4 is transferred to the brake tester device or unit and is fitted into the coupling 15. The flexible shaft 6ª is then connected between the brake testing unit and the speedometer 4 in order that both the latter and the brake tester unit will operate from the same flexible shaft that is connected to the car transmission 11. (See Fig. 1.)

The flexible shaft 6 terminates into the coupling assembly 15. The shaft 6ᶜ proper extends through said assembly. A bevel gear 16 is operated by the shaft 6ᶜ. Said gear is secured to the revoluble section of said shaft by means of the pin or set screw 19ª on the shoulder 19 of said gear. The coupling arrangement 18 is secured to the shaft 20 said shaft being secured to the bevel gear 16 which revolves in bearings 20ª and 20ᵇ and is held in position by means of the pin 21. The shaft 20 operates the flexible shaft 6ª which in turn operates the speedometer 4.

The bevel gear 16 engages with the bevel gear 17 when it is impelled against said bevel gear 16 incident to the movement of the armature 14ª. The function of the armature 14ª and its associated magnet will be further described hereinafter.

The bevel gear 17 is integral to a shaft 22 which revolves in a bushing 23. The shoulder of the gear 17 is secured to said shaft by means of a pin or set screw 24. A coiled spring 25 which is held and retained by the operating member 26, the latter being integral to the shaft 22. The said shaft and its connected operating member is impelled forward by means of the backstroke section 14ᵇ of the armature 14ª. When the magnet 14 releases said armature, the latter swinging on trunnions 27, the bevel gear 17 becomes immediately released from engagement with the bevel gear 16. The said release is accomplished by means of the coiled spring 25 which acts directly upon the operating member 26 and its associated shaft 22 and the latter is thereby forced back out of operative engagement in the manner shown in Fig. 2.

The operating member 26 is provided with a slot 28 into which a pin 29 projects. The said pin is secured to a shaft 30, the latter being made revoluble by means of the operating member 26 through the interposition of the pin 29.

In Fig. 2 there will be seen three counting wheels 31, 31ª and 31ᵇ. The wheels aforesaid have affixed upon their respective peripheries numerals from 1 to 9. The wheels aforesaid operate on a ratio of 10 to 1, so that when the wheel 31 which is attached to shaft 30, makes one complete revolution, the wheel 31ª will be moved one notch. When the wheel 31ª shall have moved one complete revolution, the wheel 31ᵇ will likewise be moved one notch. The movement of said counting wheels is determined by the distance of travel of said car after the brakes on said car shall have been applied.

The numbering wheel mechanism as described is well known to the art and therefore requires no further detailed description.

In further description of Fig. 2 there will be noticed a group of resetting gears that operate in connection with said numbering wheels.

In the group aforesaid the pinion 32 is secured to the shaft 30; the said pinion engages with the gear wheel 33. The gear wheel 33 engages through the medium of the pinion 33ª which is integral thereto with the large gear 34. A winding spring 35 operates in conjunction with the gear 34. The inner end of said spring is secured by means of a pin 34ª (Fig. 4) attached to the shoulder of the gear 34 and a slot in said spring is fitted over said pin (Fig. 4). The outer end of said spring is secured to the pin 34ᵇ. The gear and spring assembly is secured and held in position by means of the arbor 36. The said arbor is secured to the casting or metal plate 41 by means of screws as shown.

Secured to the rim of the gear 34 is a pin 34ᶜ. The said pin engages with the arm 37 which is pivoted on bearing 38. The rear section 38ª of the arm 37 is provided with an electrical contact 38ᵇ which cooperates with contact 38ᶜ, the latter contact being attached to the insulated plate 40. The contact 38ᶜ is connected to the insulated wire 39 which is held in bushing 39ª. The lever arm 37 is further provided with an electrical connection 38ᵈ.

A flat spring 37ª is secured to the lever arm 37, said spring resting against the pin 38ᴱ, the latter being attached to the plate 41. The function of said spring is to resiliently hold the arm 37 normally in the position shown in Fig. 4.

Referring to Fig. 7 which is a modification of that section of the device shown in Fig. 2. This figure shows the speedometer and the brake tester functions incorporated in one unit, the counting wheels 43 being similar in function to the counting wheels 31, 31ª and 31ᵇ shown in Fig. 2.

The push switch 42 is employed to disconnect or break the brake circuit so that the latter may not be in use continuously or unnecessarily.

The operation of the brake tester arrangement is as follows: The brake 7 is depressed by the foot of the user or operator of the car. When said depression is made, the stop light lights and likewise the magnet 14 is energized, the latter action operating the armature 14ª. The movement of said armature pushes the rear section 14ᵇ thereof against the operating member 26 causing said member to move forward which action throws the bevel gear 17 into engagement with the bevel gear 16.

It will be understood in this connection that the speedometer arrangement including the flexible shaft 6 and its associated equipment is in revoluble operation while the car is in motion. Therefore, the bevel gear 16 will revolubly operate the bevel gear 17 while the latter gear is in engagement with said gear 16. The revoluble movement of the gear 17 will start the counting wheels 31, 31ª and 31ᵇ to rotate in the manner described.

The number indications appearing upon the numbering wheels are governed by the rotation of the bevel gears which are arranged in ratio to conform to a particular model of car. Such designations upon the face of the numbering wheels are preferably shown to indicate the number of feet the car has travelled after the brakes have been applied.

While the counting wheels are in operation, the shaft 30 likewise operates the reset gearing mechanism which winds up the reset spring 35 through the medium of the train of ratio gears 32, 33 and 34.

The train of ratio gears are calculated to cause the complete revolution of the gear 34 within a limit distance that a car is estimated to travel calculating from the time the car operator has applied his foot to the foot brake and the time the car has come to a stop. The said car, however, may stop, and often does stop before the said estimated limit distance shall have been reached. In that event, and when the operator releases the pressure upon the foot brake 7, the switch 8ª is opened with the consequent opening of the circuit 9 thereby releasing the armature 14ª causing the gear 34 to reset through the medium of the spring 35; said gear 34 in turn operating the train of gears causing the resetting of the registering wheels in said device to zero position.

Just previous to applying the brake of the car, the car operator observes the speed that the car is travelling by means of the speedometer on said car. After the car has come to a stop, the mechanism has registered the distance the car has travelled from the moment the brake had been applied. When the car has come to a stop, the operator notes upon the brake tester unit, the number of feet the car has travelled before coming to the stop aforesaid.

In this manner the car operator having noted the necessary period to stop the car at a given distance with the car travelling at a given speed will be enabled to know accurately when to apply the stopping means of said car due to the comparatively simple observation of the facility afforded by the brake tester device in conjunction with the speedometer in said car.

When the large gear 34 has travelled one revolution, the pin 34c will strike against the lever arm 37 which action will cause a break or separation of the contacts 38b and 38c thereby opening the circuit including the magnet 14. When the separation of said contacts is effected, the armature 14a becomes released which in turn causes the mechanism including the bevel gear 17 and shaft 30 to retract due to the action of the spring 25. The spring 35 will then be free to cause the resetting of the counting wheels to their zero or normal position.

The necessity for the opening of said circuit is to suspend the operation of the brake tester unit after a predetermined number of feet shall have been travelled by said car with the brakes applied as already stated.

Obviously it would be undesirable to permit the brake tester unit to remain in the braking position for a distance in excess than had been fixed as the extreme number indicating limit. Should such limit be exceeded, the reset spring may become overwound which would be undesirable. It will thus be seen that in a device of this character, there is a need for electrically breaking the brake circuit after said circuit in conjunction with the associated mechanism in said device had served their purpose.

Referring to Fig. 9 which illustrates the position of the pin 34c against lever 37 after the gear 34 has made one complete revolution. The foregoing action occurs when the braking distance of said car has reached the limit of said registering means.

For example, if the testing unit on a car is calculated to register for a limit distance of approximately 200 feet. When the braking distance of said car has exceeded the aforesaid 200 foot limit, the registering means is disconnected by means of the circuit disconnection as illustrated in Fig. 9. The safety switch aforesaid is operative when the braking distance of the car has exceeded the distance to which said unit is calculated to register. Furthermore, the switch is also operable when the brakes are applied while the car is travelling in reverse direction. The position of the safety switch at the time the car is travelling in reverse direction is shown in Fig. 6.

It is obvious that the illustrative form of construction of my invention may be modified in many ways without departing from the scope of the appended claims.

Having thus fully described my invention, what I claim as new and desire to secure by Letters Patent is:

1. In combination, a brake tester unit attachable to an automobile, said brake tester having means contained therein for registering the distance said automobile has travelled after brakes therein had been applied; a speedometer operating in conjunction with said brake tester; a flexible shaft rotatably connected with the transmission of said automobile, said shaft connected to and rotatably operating simultaneously with said registering means in said brake tester and said speedometer; means for connecting and disconnecting said registering means in said brake tester with said flexible shaft, said connecting and disconnecting means made substantially operable through the depression of the foot brake in the said automobile and means in said brake tester unit to restore said registered indications to zero position upon the disconnection of said brake tester unit with the flexible shaft aforesaid.

2. In combination, a brake tester unit attachable in an automobile or the like, said brake tester unit having means contained therein for registering the distance said automobile has travelled after brakes therein had been applied; a speedometer operating in conjunction with said brake tester unit; a flexible shaft rotatably connected with the transmission of said automobile, said shaft connected to and rotatably operating both said registering means in said brake tester and said speedometer; a bevel gear attached to said flexible shaft, a bevel gear rotatably attached to said registering means; electric circuit controlled means for controlling the engagement and disengagement of said bevel gears, said electric circuit controlled means made operable by the depression of a foot brake in the automobile aforesaid.

3. The structure as set forth in claim 2, said electric circuit controlled means consisting of an electro-magnet, a power source and a control switch; the armature of said electro-magnet controlling the engagement of said bevel gear that is attached to said registering means and with the bevel gear that is attached to said flexible shaft; said control switch made operable by means of the foot brake of the automobile aforesaid.

4. In an automotive vehicle having a speedometer therein, a brake tester indicating unit operably in connection with said speedometer, a control switch made operable through the medium of pressure upon a foot brake in said automobile said switch causing the operation of said brake tester unit, said brake testing unit having means for indicating the distance said automobile has travelled after said brake had been applied; and electrically controlled spring wound gearing means in said unit for restoring said distance indications to zero position after the pressure upon said foot brake had been lifted.

5. In a brake tester indicating device attachable to an automobile said device having means contained therein for indicating the distance said automobile has travelled after brakes therein had been applied; said indicating means operably connected with a flexible shaft that is made rotatably operable by means of the transmission of said automobile; means for connecting and disconnecting said flexible shaft with respect to the operation of said indicating means; said connecting and disconnecting means made initially operable through the depression of a foot brake in said automobile and through the medium of electric circuit controlling means; and means in said device to cause the registered indications thereon to be restored to zero position upon the disconnection of said brake tester unit with the flexible shaft aforesaid.

6. In combination, a brake tester unit attachable to an automotive vehicle, said unit having a series of counting wheels contained therein for registering the distance said automobile has travelled after brakes therein had been applied; a speedometer operating in conjunction with said brake tester unit; a flexible shaft rotatably connected with the transmission of said automobile, said shaft connected to and rotatably operating both said counting wheels in said unit and said speedometer; an element rotatably attached to said counting wheels, a second element rotatably attached to said flexible shaft; electric circuit controlled means for controlling the engagement and disengagement of said elements, said electric circuit controlled means made substantially operable by the depression of a foot brake in said automobile, said engagement of said elements to cause said counting wheels to move, and the disengagement of said elements to cause the stoppage of the movement of the counting wheels aforesaid.

7. The structure as set forth in claim 6 and means in said brake tester unit for disconnecting and rendering inoperative said electric circuit controlled means after the distance of said automobile had exceeded the calculated limit distance to which said counting wheels had been adjusted; and electrically controlled spring wound gearing means in said brake tester unit for resetting said counting wheels to zero position upon the disconnection of the electric circuit controlled means aforesaid.

8. The structure as set forth in claim 2 and means in said unit for disconnecting and rendering inoperative said registering means after said registering means had reached the limit of registerable distance that said automobile is calculated to stop after said foot brake had been applied, said disconnecting means including a train of gears rotatably attached to said shaft that rotatably operates said registering means, a resetting spring that is wound by said gear train; said disconnecting means controlled and operated by said gear train; said gear train likewise resetting through the medium of said resetting spring said registering means after a brake test had been completed and the depression upon said foot brake had been lifted.

9. Apparatus for indicating the distance an automobile has travelled after the brake is applied, comprising a distance measuring unit for disengageable connection with a moving element of the automobile, means for disengageably connecting said unit with said moving element, said unit including a gear train, a spring resetting means for zeroizing said unit upon disengagement from said moving element, means for actuating said disengaging means comprising an electric circuit including an electro-magnet for actuating said disengaging means and a switch in said circuit, means movable by said gear train and arranged to actuate said switch after the measuring unit has been applied to said moving element during a predetermined distance of travel of the automobile.

PHILIP MESHBERG.